United States Patent [19]
Brown

[11] Patent Number: 5,875,435
[45] Date of Patent: Feb. 23, 1999

[54] AUTOMATED ACCOUNTING SYSTEM

[76] Inventor: Gordon T. Brown, 2045 Murdstone Rd., Pittsburgh, Pa. 15241

[21] Appl. No.: 80,497

[22] Filed: May 18, 1998

Related U.S. Application Data

[63] Continuation-in-part of Ser. No. 313,988, Sep. 28, 1994.

[51] Int. Cl.$^6$ ........................................................ G06F 17/60
[52] U.S. Cl. .................................. 705/30; 705/33; 705/39
[58] Field of Search .................................. 705/1, 19, 30, 705/33, 34

[56] References Cited

U.S. PATENT DOCUMENTS

| | | |
|---|---|---|
| 4,376,978 | 3/1983 | Musmanno . |
| 4,727,243 | 2/1988 | Savar . |
| 4,953,085 | 8/1990 | Atkins . |
| 5,093,787 | 3/1992 | Simmons . |
| 5,126,936 | 6/1992 | Champion et al. . |
| 5,172,313 | 12/1992 | Schumacher . |
| 5,193,055 | 3/1993 | Brown et al. . |
| 5,202,826 | 4/1993 | McCarthy . |
| 5,220,500 | 6/1993 | Baird et al. . |
| 5,220,501 | 6/1993 | Lawlor et al. . |
| 5,262,942 | 11/1993 | Earle . |
| 5,283,829 | 2/1994 | Anderson . |
| 5,326,959 | 7/1994 | Perazza . |
| 5,383,113 | 1/1995 | Kight et al. . |
| 5,406,475 | 4/1995 | Kouchi et al. . |

OTHER PUBLICATIONS

B. Altman, Check Free: A Viable Bill–Paying Alternative; *PC Magazine,* Jan. 16, 1990.

Interview with Don Kniffin, *TMA Journal,* Jan./Feb. 1994, ISSN:0731–1281, pp. 34–38.

*Primary Examiner*—Edward R. Cosimano
*Assistant Examiner*—Barton L. Bainbridge
*Attorney, Agent, or Firm*—Alan G. Towner; Eckert Seamans Chepin & Mellott, LLC

[57] ABSTRACT

An automated accounting system for an entity, such as an individual or business, is provided in which at least one file is established for the entity and a plurality of data inputs are provided to the file. The data inputs include electronically recorded transactions made between the entity and other entities. Access is provided to the file for agents of the entity so that one of the agents can perform one or more activities related to the data inputs such as entering, deleting, reviewing, adjusting and processing.

18 Claims, 4 Drawing Sheets

AUTOMATED ACCOUNTING SYSTEM

CROSS REFERENCE TO RELATED APPLICATION

This application is a continuation-in-part of U.S. application Ser. No. 08/313,988 filed Sep. 28, 1994.

BACKGROUND OF THE INVENTION

This invention relates to an automated accounting system, and more particularly, to providing an automated accounting system for an entity such as an individual or a business in which a plurality of data inputs are made to a file established for the entity, the data inputs including electronically recorded financial transactions made between the entity and other entities. Access is provided to the file for agents of the entity being served so that one of the agents can perform one or more activities related to the data inputs, such as entering, deleting, reviewing, adjusting and processing the data inputs.

There have been proposed a number of systems and methods in which financial and business information has been computerized. My U.S. Pat. No. 5,193,055 discloses an accounting system in which a standard category code listing is used to code money transfer instruments, such as checks, into a computer file. The information in that computer file is then used to generate various accounting reports. The standard category codes can be personalized in order to meet the particular needs of the user. For example, job numbers can be coded on the check to track income and expense for individual projects.

U.S. Pat. No. 5,220,501 discloses a method and system for remote delivery of retail banking services. A user can access an ATM (Automatic Teller Machine) from a dedicated remote data terminal in order to transfer funds from a bank account to a third party payee. A central computer receives instructions from the remote terminal and debits the user's bank account as well as distributing the funds to payees requested by the user. See also U.S. Pat. No. 5,202,826.

Despite the existence of these systems, no one has conceived a total accounting system in which users, such as businesses, individuals, merchants, financial institutions and other entities are connected into a network where financial transaction information is captured, analyzed, reviewed, adjusted and processed and then used to generate accounting statements.

As computer hardware technology becomes more advanced and less expensive, many if not most financial transactions will be electronically recorded. For example, if a customer purchases a building product, such as a window, from a building products dealer, that sale can be electronically recorded in a ledger in the building product dealer's computer. No one, however, has conceived of a system in which the user and the building product dealer are connected in a network such that the recorded financial transaction, along with all other financial transactions recorded in the network, could be used to generate accounting records useful to the members of the network.

The recorded financial transactions, in order to be useful to the multitude of different users in the network, must be accessible to various agents. There is a need therefore for agents, such as accountants, to have access to the recorded financial transactions before, during and after the financial transaction is made. In this way, electronically recorded financial transactions can be entered, deleted, reviewed, adjusted and/or processed in order to provide the proper input data for the system.

After the data has been entered and reviewed, it would be desirable for the user to be able to choose which services are required from the system. For example, an individual may only be interested in obtaining tax accounting services, whereas a business may need a more complete set of financial reports.

Finally, an effective system must have a funds transfer clearinghouse, such as that disclosed in U.S. Pat. Nos. 5,220,501 and 5,202,826.

What is needed, therefore, is a connected system (or network) of users, such as individuals, businesses, merchants, financial institutions and other entities, that can provide its users a method of automating the accounting of all financial transactions made by the user and other entities in the network.

SUMMARY OF THE INVENTION

An automated accounting system for an entity, such as an individual or business is provided in which at least one file is established for the entity and a plurality of data inputs are provided to the file. The data inputs include electronically recorded transactions made between the entity and other entities. Standardized codes including financial transaction codes and/or standardized itemization codes are established. The automated accounting system preferably uses a common language in and among computer systems and/or entities to enable the computer systems and/or entities to communicate processing instructions and utilize the standardized codes. Individual codes are provided before, during or after the time of the transaction for automated entry into single and multi-tiered uniform accounting ledgers. Access may be provided to the file for agents of the entity so that one of the agents can perform one or more activities such as entering, deleting, reviewing, adjusting and processing.

In one embodiment of the invention, I provide a method of providing financial accounting reports and statements for a first entity such as an individual or a business. The method includes the steps of providing a menu of standardized codes, including financial transaction codes and/or itemization codes, conducting through other entities separate financial transactions including transfer of funds and instruction for transfer of funds with the first entity at a plurality of separate points, associating the standardized codes from the menu at the time when the funds are transferred or instructions are given for transfer to complete the financial transaction, transmitting a record of each transaction and selected standardized codes to at least one separate financial accounting system at about the time of the transaction, sorting the transactions in the separate financial accounting system and producing an accounting statement in a desired format, and printing or electronically displaying the statement results.

In another embodiment of the present invention, I provide a financial accounting system including a financial accounting computer having at least one file, a financial transaction computer for receiving data inputs including electronically recorded financial transactions made between a first entity and a second entity, first communication means for transferring the data inputs from the financial transaction computer to the file of the financial accounting computer, and means for providing access to the file of the financial accounting computer for the first entity and/or agents of the first entity so that the first entity and/or the agent can perform one or more activities selected from the group consisting of entering, deleting, reviewing, adjusting and processing the data inputs.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

The method and system of the invention provide an automated accounting system which brings together in a connected or network fashion, all of the various entities that are involved with financial transactions between a first entity, such as an individual or a business, and other entities, such as merchants, financial institutions and the like. The financial transactions are recorded as data inputs in a file established for the first entity. The data inputs can be accessed by agents of the first entity, such as accountants, money managers and the entity itself, in order to enter, delete, review, adjust or process the data inputs.

The first entity can be a business or an individual. The entity being served will have established at a central or host computer a master ledger that is used to receive data inputs in the form of electronically recorded financial transactions. It will be appreciated, however, that the central or host computer can be the individual entity's personal automatic computing device (such as a personal computer or a telephone computing device) which can receive the data inputs and, in the case of a personal computer, for example, process the data inputs by using off-the-shelf accounting software. Therefore, even though the specification set forth herein will focus on a central or host computer, it will be appreciated that the above mentioned alternatives of a personal or telephone computer are contemplated by the invention.

Figure 1:
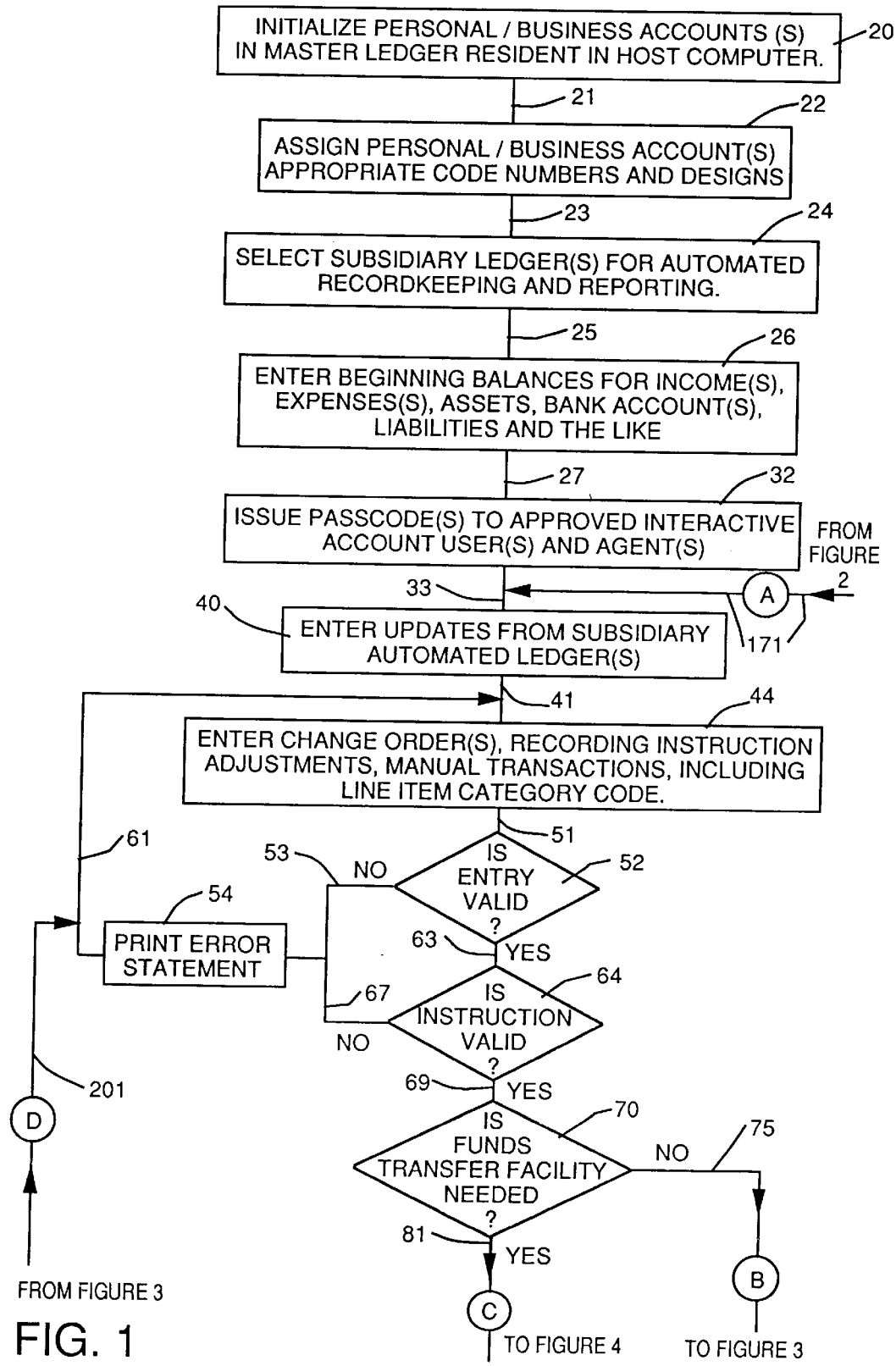
FIGS. 1–4 are flow charts showing the method and system of the invention.

FIGS. 1–4 show a flow chart which illustrates the invention. Referring in particular to FIG. 1, in box 20, the personal and business accounts resident in the master ledger in the host computer are initialized. This may include, for example, selecting automatic coding preferences, source inclusions, business accounting rules, reporting detail, individual job record-keeping and interactive user authorization registrations. All of these selections personalize and customize the master ledger for effective use of the invention. Also, two separate master ledgers can be established, for example separate cash and accrual ledgers, so that desired data can be entered into these ledgers and can be used to provide both tax preparation and cash reports.

The system then proceeds by line 21 to box 22 where the accounts as established above are assigned code numbers. A standardized account menu for business and personal financial transactions is most often times established (see, for example, U.S. Pat. No. 5,193,055), however, establishment of subcategories of income and expense items may be made resulting in more than one detailed subcoding schedule. Standardized account formats are generally used to provide information to outside agents, whereas the more complex subcoded detail is generally retained by the entity using the system for internal use only.

Next, line 23 leads to box 24 where subsidiary ledgers for automated record keeping and reporting are selected. While a master ledger is established in a central or host computer, subsidiary ledgers are established in computers, such as personal computers, at all entities with which the first entity will enter into financial transactions. These subsidiary ledgers can be established with financial institutions, merchants, and other entities with which the entity being served will have financial transactions, including but not limited to automated teller machines, telephonic computers, banks (for checking and savings accounts, for example), investment/brokerage firms, merchants and other automated systems/record keeping devices. Automatic coding devices can be associated with these subsidiary ledgers to record and transmit data concerning the financial transaction at the time of the financial transaction. The key idea is for all of these entities to electronically record, collect, process, store and transmit all financial transactions by all of the entities, including the first entity, that enter into financial transactions with that particular entity. In this way, all of the entities can be connected in a network fashion so that accounting information can be fully and accurately developed among all of the entities. Recorded transactions may be entered into one or more tiers (layers) or subsidiary ledgers of either the cash or the accrual ledger or both ledgers to facilitate computation and reporting of more than one accounting procedure at a single time through the use of one or more common language instructions and standardized transaction codes which may include one or more of the following: transaction process instructions, charts of accounts, user selection menus, accounting rules and standard calculations, funds transfers instructions and codes, individual system network instruction codes, and layers or tiers of instructions and financial accounting codes for individual system or connected systems operations. The establishment, operation and transfer of data from the subsidiary ledger to the master ledger will be discussed in greater detail below with respect to FIG. 2.

Referring back to FIG. 1, the subsidiary ledgers that are desired to be included in the master ledger are selected at box 24. Even though every entity with which the first entity is connected will have a subsidiary ledger, the first entity may only desire to have certain data inputs transferred from the subsidiary ledgers to the master ledgers. For example, the first entity may only want data inputs from financial institutions and not merchants. In this box 24, that selection can be made.

After box 24, the system proceeds by line 25 to box 26 where beginning balances for income, expense, asset, bank accounts and liabilities are entered. Next, line 27 leads to box 32 where passcodes are issued to approved interactive account user(s) and agent(s). Agents can include accountants, brokers or other financial advisors. The account user(s) can include the first entity as well as authorized users of the first entity, such as the controller or bookkeeper of a business. This access to the master ledger and subsidiary ledgers allows the agents to perform activities selected from the group consisting of entering, deleting, reviewing, adjusting and processing data inputs in the master ledger and subsidiary ledgers. This access allows agents to enter, delete, review, adjust and process data inputs before, during and after a financial transaction in order to customize the transaction to make it fit into the accounting scheme of the individual entity. Users may select the degree and timeliness of master or subsidiary ledger computations and reporting with or without operation of their own computer.

Figure 2:
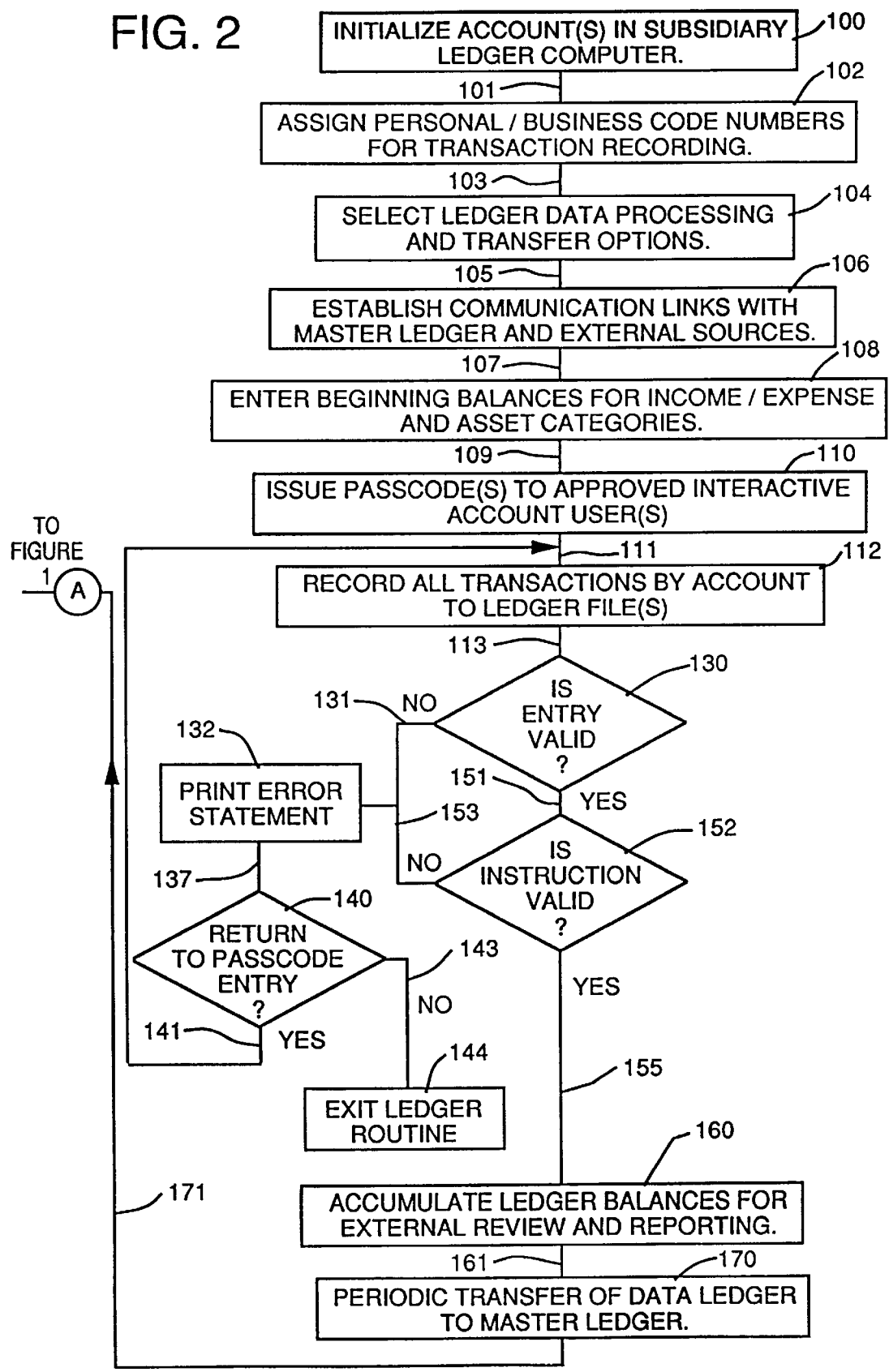

Next, line 33 leads to box 40 where the updates from the subsidiary ledgers are entered into the master ledger. Referring now to FIG. 2, the establishment of, operation of and transfer of data from the subsidiary ledgers will be discussed. It will be appreciated that each of the other entities in the network will have means (usually computers and probably PC's) which will be used to electronically record, collect, process, store and transmit all financial transactions between the first entity (and other entities) with that particular entity.

In box 100, the accounts are initialized in the subsidiary ledger computer. This step is similar to the initialization step in box 20 of FIG. 1. Next, line 101 leads to box 102 where the personal/business code numbers for transaction recording are assigned also similarly to box 22 in FIG. 1. In addition, individual job accounting (receipting and costing) may be automatically facilitated by an alphanumeric identifier at the point of entry. Vendors and payees may be listed by category for automatic ledger entry and coding.

Line 103 then leads to box 104 where the ledger data processing and transfer options are selected. For example, automatic codes and/or instructions are entered into ATM's, point-of-purchase machines, check reading equipment or other systems where the subsidiary ledger is maintained. These codes can identify methods for funds transfer and accounting for each of the subsidiary ledgers. For example, credit balances may be maintained automatically by account until requests for funds transfer are answered with remittance. If no payment is made within a predetermined time, balances are added to personal company payables and receivable lists either automatically or by command.

After this, line 105 leads to box 106 where communication links with the master ledger and external sources are established. It will be appreciated that although agents have access to both the master and subsidiary ledgers, the access can be restricted by instituting predefined communication rules. However, transmittal of transaction records and account balances are made routinely from the subsidiary ledger to the master ledger as will be described below. Line 107 leads to box 108 where the beginning balances for income/expense and asset categories are entered.

Next, line 109 leads to box 110 where passcodes are issued to approved agents. In order to ensure access to the subsidiary ledger by the first entity and agents of the entity being served, passcodes are issued to the approved interactive account user(s) including agents of the entity being served at box 110.

The system then proceeds by line 111 to box 112 where the financial transactions by account are recorded to the subsidiary ledger. For example, in the case of a merchant, the first entity may buy an item and this financial transaction will be recorded. Check imaging equipment may be designed to read check face information including coding for automatic entry into subsidiary ledgers for financial transactions between the entity and other entities. Similarly, a 4–5 digit coding sequence may be installed in ATM transaction files for users to identify sources and uses of funds. Credit card transactions, however, will likely require the entry at the point-of-purchase of appropriate coding information.

Line 113 then leads to decision box 130 where the entry is then reviewed as to whether it is valid or not. If not valid, line 131 leads to box 132 where an error statement is printed. After this, line 137 leads to decision box 140 where a decision must be made to return to passcode entry by line 141 or by line 143 to exit the ledger routine 144.

If the entry is valid, line 151 leads to decision box 152 where the instruction is reviewed for validity. Validity is determined by comparing amounts, codes, vendors and payees with those preestablished coding and decision rules elected in boxes 22, 24 and 102, 104. Invalid entries are recorded separately for security reasons. Valid entries are included in subsidiary and master ledger calculations. More specifically, if the instruction is not valid, line 153 leads to box 132 and the same procedure as was discussed above is repeated. If the instruction is valid, line 155 leads to box 160 where the subsidiary ledger balances for external review and reporting are accumulated.

The system then proceeds by line 161 to box 170 where the periodic transfer of data inputs from the subsidiary ledger to the master ledger is set forth. This can be accomplished by a modem, or other data transfer equipment. This is shown by line 171 which goes to line 33 of FIG. 1.

Referring back to FIG. 1, the data inputs from the subsidiary ledgers are transferred to the master ledger. Line 41 then leads to box 44 where the access to the data inputs in the master ledger is set forth. This access can be provided to interactive users and agents of the first entity. At this box 44, change orders, recording instruction adjustments, manual transactions and the like can be entered by the agents or the interactive users.

After this, line 51 leads to decision box 52 where the validity of the entry is determined. If the entry is not valid, line 53 leads to box 54 where an error statement is printed. Once the error statement is printed, the method returns to box 44 by line 61. If the entry is valid, line 63 leads to decision box 64 where the validity of the instruction is determined. Validity is determined by whether the passcode matches the predesignated list of approved passcodes and whether the entry is complete in form and substance. For example, if either the form or substance of the attempted entry is dissimilar with past transaction records for that user, a request for further information will be initiated. If the instruction is not valid, line 67 leads to box 54 where an error statement is printed. If the instruction is valid, then line 69 leads to decision box 70.

In decision box 70, the user is asked whether the funds transfer facility is needed. If the funds transfer facility is not needed, line 75 leads to the accounting statement module shown in FIG. 3. If the funds transfer facility is needed, line 81 leads to the network transfer facility shown in FIG. 4.

Figure 3:
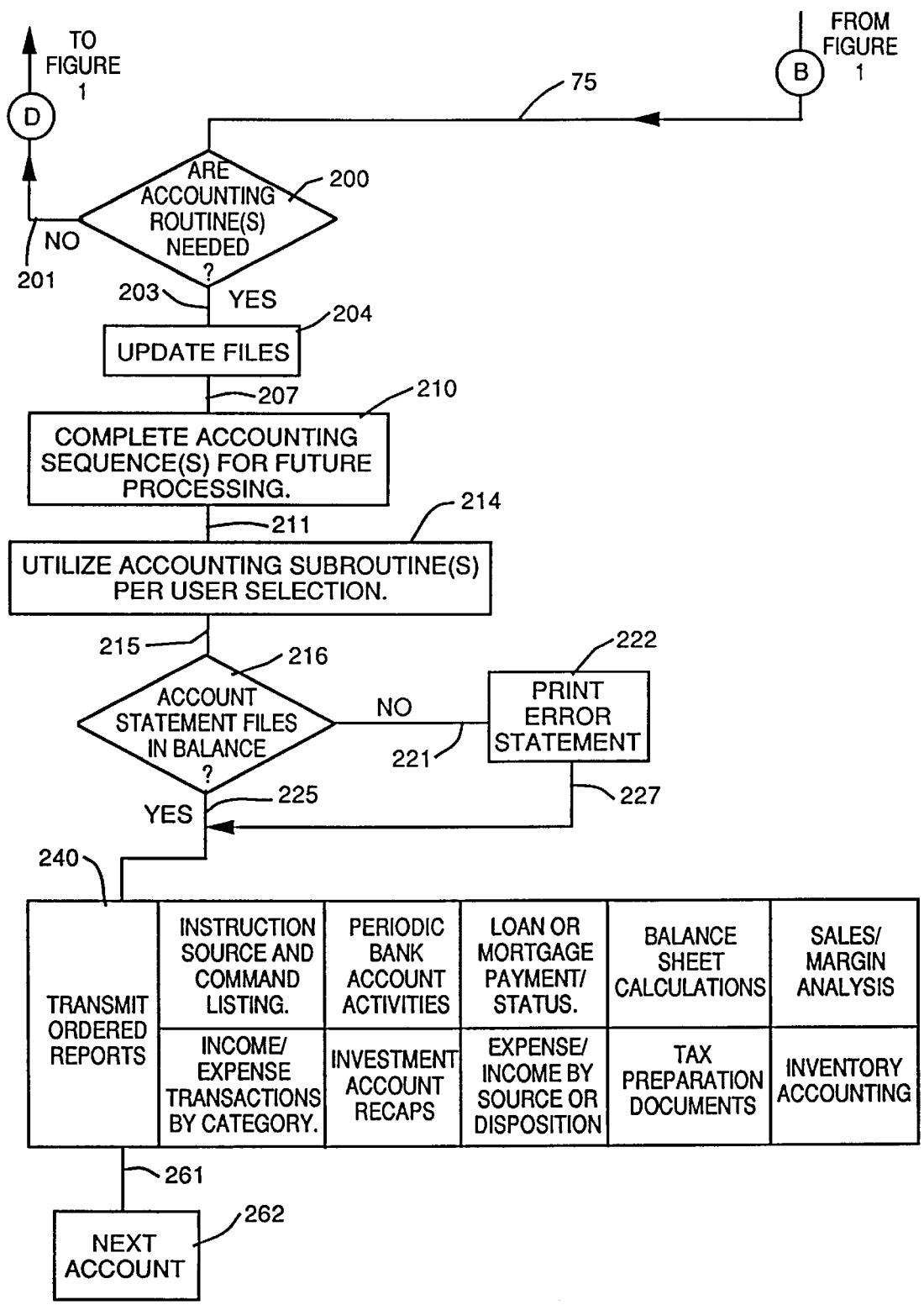
Figure 4:
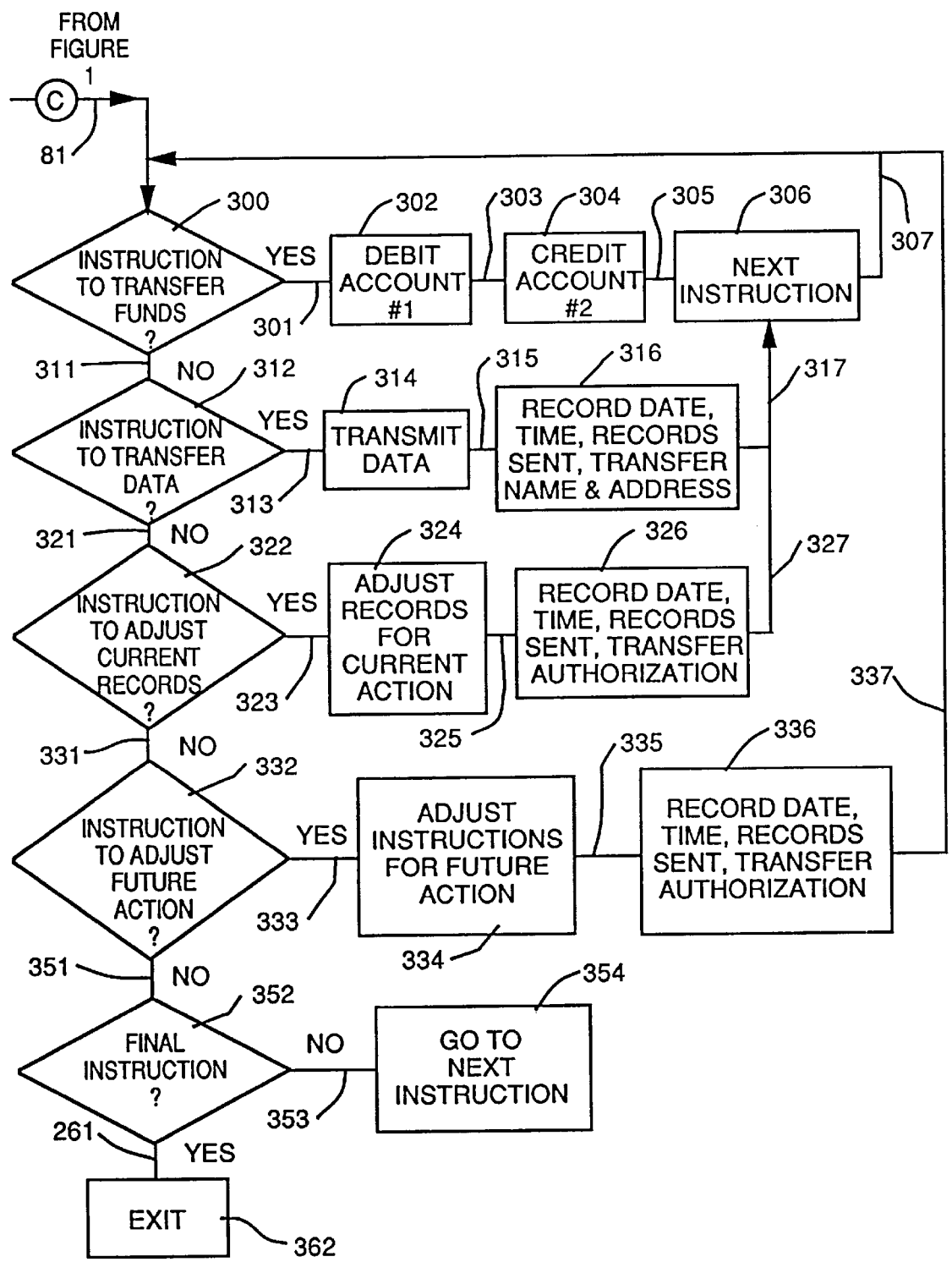

Referring now more particularly to FIG. 3, line 75 leads to a decision box 200 in which the user is asked whether accounting routines are needed. If not, line 201 leads back to line 61 (FIG. 1). If the accounting subroutine is desired, line 203 leads to box 204 where the files are updated according to the entity's report selections. If simple cash accounting routines have been selected, then only those accounting subroutines will be effected. If tax preparation reports are requested, then all accounting subroutines necessary to complete those tax reports are effected. After this line 207 leads to box 210 where the accounting sequences for future processing are completed. For example, daily, weekly, monthly and annual reports, including statistical comparisons for this and other uses, may then be printed at the user's option. Subroutines for each option permit users to personalize individual and business record keeping and reporting.

Line 211 then leads to box 214 where accounting subroutines selected by the first entity are utilized. In this way, the first entity can select one or more or all of the available accounting statements desired. For example, an individual may be only interested in obtaining tax preparation documents, whereas a business may desire a full set of financial documents, including balance sheets and income statements. Thus, the system is truly a self service system in that the first entity can select the desired accounting reports from a large menu of available reports. The pricing of the system can be tailored to this choice. For example, a first entity needing only two reports would pay less for use of the system than a user needing ten reports.

After this, line 215 leads to a decision box 216 where account statement files are determined to be balanced or not. If not, line 221 leads to box 222 where an error statement is printed. If the account statements are in balance, line 225 leads out of box 216. Line 227 leads out of box 222 after the error statement is printed in order to join line 225. The error statement will direct the entity (or agent) to make appropriate adjustments to coded transactions which result in balanced accounts in both subsidiary and master ledgers.

After this, the ordered reports are transmitted to the entity being served at box 290. Ten separate reports are shown in box 240. The reports can be electronically mailed or hard copies can be produced and forwarded to the user by telefax, messenger, overnight courier or first class mail. The advantage of the system is that these reports can be processed faster than currently available services.

After this, line 261 leads to a box 262 which asks for the next account to be processed.

If the funds transfer facility is needed, line 81 leads to decision box 300 where it is asked whether an instruction to transfer funds is desired. The funds transfer facility allows automatic (electronic) transfer of funds/payments by and between the entity's accounts (banks, for example), as instructed. Access to any and all payment clearinghouses is anticipated along with the funds transfer facility. Line 301 leads to box 302 where account no. 1 (that of the merchant, for example) is debited with the funds and then by line 303 to box 304 where account no. 2 (that of the entity being served) is credited. If desired, credit balances may be maintained automatically by account until requests for funds transfers are answered with remittance. If no payment is made within a predetermined time, balances are added to company and payables and receivables lists either automatically or by command. After this, line 305 leads to box 306 where the next instruction is requested and then by line 307 back to box 300 to start the process again.

If a transfer funds instruction is not requested, line 311 leads to decision box 312 where the user is asked whether there is an instruction to transfer data. For example, an entity may elect to transfer vital operating statistics to a banker for loan monitoring purposes. Suppliers of material can ship replacement inventory quickly and accurately with current sales history and inventory replenishment requirements transmittals. Finally, payroll statistics are often times required to be provided by the entity to government agencies, health providers, labor unions, and the like. If so, line 313 leads to box 314 where the data is transmitted and then by line 315 to box 316 where the date, time, records sent, transfer name and address are recorded. After this, line 317 leads to box 306 where the next instruction is requested.

If a transfer data instruction is not requested, line 321 leads to decision box 322 where the user is asked whether there is an instruction to adjust current records. Entities or agents can enter coded records of financial transactions or adjust current account records when certain transactions have not been automatically recorded by the system and when errors in previous entries have occurred. If so, line 323 leads to box 324 where the records are adjusted for current action and then by line 325 to box 326 where the date, time, records sent, and transfer authorization are recorded. After this, line 327 leads to box 306 where the next instruction is requested.

If an adjust current records instruction is not requested, line 331 leads to decision box 332 where the user is asked whether there is an instruction to adjust future action. Periodically, entities and users must change decision rules previously entered into the system. Adjustments in system recording or reporting may stem from changes in generally accepted accounting principles, reporting period changes, depreciation adjustments, income or expense category additions or deletions, cash versus accrual interpretations, statistical comparison definitions and the like. Line 333 leads to box 334 where the instructions are adjusted for future action. After this, line 335 leads to box 336 where the date, time, records sent and transfer authorization are recorded. After this, line 337 leads back to box 300 at the beginning of the network transfer facility module.

If an adjust future action instruction is not requested, line 351 leads to decision box 352 where the user is asked whether this is a final instruction. If not, line 353 leads to box 354 where the method goes to the next instruction. If it is the final instruction, line 361 leads to box 362 where the funds transfer facility is exited.

It will be appreciated that an automated accounting system is shown in which a first entity and other entities with which the first entity enters into financial transactions are in a connected network. Access is provided to the electronically recorded financial transactions for agents of the first entity, such as accountants. These agents can perform activities such as entering, deleting, reviewing, adjusting and processing data inputs. In addition, accounting reports can be generated and a funds transfer facility is provided.

The following example illustrates various aspects of the invention, and is not intended to limit the scope of the claimed invention.

EXAMPLE

Consider the example of a building contractor's purchase of a $500 window for installation in an apartment complex from a building materials retailer by check or credit card. Under conventional systems, the purchase would not be recorded since only computer-to-computer transactions between related on-line suppliers and their wholesale or retail agents are recorded. If the window transaction related to a sale of inventory goods from a manufacturer to a dealer, the inventory number of the item would have been recorded in a file for later accumulation with other itemized transactions which accumulations would be reported as historical evidence that the transaction took place on a specific date as part of one or more order placements. Funds would have been transferred electronically to pay for the item at the appropriate time. The total number of transactions could be reported to both parties using the nomenclature, usually including standardized item numbers agreed upon by the parties which numbers appear within the bill presentments and inventory replenishment account files within the computer-to-computer system. Specifically, if a window had been requisitioned via a conventional system, a 3 feet wide by 4 feet tall double-hung window might have a DHW34 standard code. The DHW34 unit would be entered (sometimes automatically) as an inventory addition to the inventory ledger of the purchaser and a corresponding reduction in the cash account file would occur (sometimes automatically). The reverse would take place in the vendor's ledger files. The total items and funds transferred would be periodically reported for inventory and cash account purposes only.

The automated accountant system of the present invention recognizes that the bulk of transactions in an economy do not take place wherein users are interconnected computer-to-computer. The window example and most of those in the retail trade do not involve purchaser computers at all. A $500 DHW34 window purchase by a contractor is usually accomplished by check or credit card. If a check is used within the present automated accountant system, the contractor would enter on the check face appropriate standardized codes which identify a preferred accounting treatment of the window purchased. The standardized code would specifically identify one or more of the following: the type of item purchased, the anticipated use or category of that item, the specific job for which the inventory was purchased, and any depreciation and expense parameters. The $500 amount, along with the accounting codes representing specific past, present and future accounting considerations, is preferably automatically read by check processing/imaging equipment and the information electronically entered by the use of common system language and standardized codes into the contractor's account files at a financial institution or elsewhere for tabulation, manipulation, reporting and review. The account files of the vendor may or may not be automatically adjusted for the transaction. However, the vendor's cash account file would be increased automatically by the $500 amount, that receipt being categorized as a type of income transaction.

If a credit card or other means of electronic payment is employed by the contractor to pay for the window, the vendor (in this case, the building materials retailer) uses pre-entered common system language and standardized codes relating to the DHW34 window unit which would be electronically transmitted at the point of credit verification or shortly thereafter, adjusting the appropriate account files of the vendor, automatically identifying the item (window) category for contractor account ledgers. The adjustment of files may take place outside the transaction system. More than one transaction system must be integrated together to report separately recorded transaction detail to, in this case, the contractor's and the building materials vendor's automated accounting ledgers.

Assuming a credit card is used to purchase the $500 window, the $500 debt would be registered in the contractor's credit card payable ledger. The $500 would be allocated to the contractor's job costing file (in this case, the job might be labeled the "rental units job") which would be separated from other contractor files for purposes of reviewing profit and loss on the "rental units job". The $500 would also be entered into a depreciation file for "rental units job" for calculation of present and future depreciation. If the contractor owns the rental units, the $500 represents a capitalized addition to the asset account, which is depreciated, not expensed, over time. The $500 amount is divided by the number of years of permissible useful life, which amount is automatically carried forward in ledgers for deduction in future periods as determined by generally accepted accounting practice. Each future income and expense and assets and liability statement would report both current cash and accrual detail. Tax calculations are performed automatically from the accumulation of all pertinent cash and accrual detail if desired.

Both the contractor and the building materials vendor in this case likely operate bank accounts with one or more financial institutions. Generally, one company or individual account controls the overall operation of the business or household. Subsidiary bank accounts may be established to operate payroll, accounts receivable, escrow, savings and other separate financial functions. Subsidiary account transactions may be combined with controlling bank account transactions for monthly, quarterly and yearly totals and analyses. The cash balances in bank accounts offer a readily available benchmark to determine the accuracy of transaction figures at month end and year end. Both the contractor and building material vendor will attempt to balance bank figures with privately generated figures. Periodic (e.g., monthly) income and expense statements may be calculated automatically once transaction details from multiple transaction systems (e.g., credit card, check, debit card, telephone payment, electronic bill payments, etc.) are transferred to control account ledgers through the use of common language and standardized code structures within and between each of the transaction systems.

When the $500 window payment is automatically recorded in the contractor's check or credit card ledger, a $500 deduction from cash balances is recorded. The $500 is categorized as a specific expense or asset per the original transaction codes. The $500 is both cash or an income item on the vendor's books, automatically recorded per the original transaction codes. The $500 means much more in terms of accounting than in conventional systems because the $500 represents both a financial indication of present and future financial treatment by the user. Prior art systems deal in current assets and liabilities; that is, in inventory items and funds payments. The present automated accountant system deals in current assets and liabilities, in past and future assets and liabilities, in current revenues and expenses and taxes, and in past and future revenues and expenses and taxes.

The $500 paid for a DHW34 window is statistically significant for both the vendor and contractor as well as other interested analysts. It is significant in light of the types and numbers of similar and other window units sold or purchased by the contractor, vendor and other contractors and vendors. That significance takes on greater importance when multiple transaction systems can, through the use of one or more common languages and standardized codes, compare and contrast the transactions of other similar or different users of the system. Standardization facilitates the collection of large masses of transaction details for past, present and future comparisons and analysis. The multiple layers or tiers of income, expense, asset and liability recordation that takes place within and among the transaction systems which can be tied together by the present automated accountant system provide opportunities for understanding consumption habits, management efficiencies, profits and losses, tax consequences and other demographics.

The automated accounting system of the present invention possesses several advantages over conventional systems. The present automated accountant is an accounting system enabling ongoing financial planning, P/L analysis, and critical path decisioning. Consumers may dynamically control depreciation, amortization, suspense accounts, expense/income levels, principal, interest, P/L, etc. While categorization is part of the process, the system also includes dynamic, multi-dimensional consumer controls, and provides computational intelligence, all resulting in informed business decisions as a result of the output.

While conventional automatic bill payment services offer consumer payment control with a transaction register, the present automatic accounting system permits consumer controlled dynamic interaction and integration of multiple debits and credits. In addition, the present system produces incremental results, enabling future critical path financial decisions. Furthermore, while conventional automatic bill paying systems create a categorized historical transaction register, the present system converts data into intelligence via multi-dimensional consumer control structure and comprehensive assessment of financial characteristics critical to business/personal financial success.

The system of the present invention is a personalized and dynamic accounting system providing targeted future business/personal financial strategies. The present system may accumulate multiple financial data and create a personalized profile noting "critical path" financial management areas. A simple single threaded activity summary listing enables the posting of payment activity, and consumer controls result in payments executed by the service provider and the creation of a payment transaction register.

The automated accounting system of the present invention provides a data accumulation and computational intelligence engine which transforms data into intelligence. Consumers may control the engine with a set of tools permitting multi-dimensional classification of transactional activity. The results enable informed decisions as to ongoing business and personal financial matters.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of providing financial accounting reports and statements for a first entity such as an individual or a business which comprises:

providing a menu of standardized codes, including financial transaction codes and/or itemization codes;

conducting through other entities separate financial transactions, including transfer of funds and instructions for transfer of funds, with the first entity at a plurality of separate points;

associating the standardized codes from the menu at the time when funds are transferred or instruction are given for transfer to complete the financial transaction;

transmitting a record of each transaction and selected standardized codes to at least one separate financial accounting system at about the time of the transaction;

sorting the transactions in the separate financial accounting system and producing an accounting statement in a desired format; and the separate financial accounting system printing or electronically displaying the statement results.

2. The method of claim 1, including entering into said separate financial accounting system information regarding said first entity.

3. The method of claim 2, wherein said information includes beginning balances for income, expenses, assets, liabilities, bank accounts and the like.

4. The method of claim 3, including entering into said separate financial accounting system coding information appropriate to said first entity.

5. The method of claim 1, including providing said first entity a passcode to permit access to said separate financial accounting system.

6. The method of claim 1, including providing a subsidiary ledger for each of said other entities; and transferring selected subsidiary ledgers from said other entities to said separate financial accounting system.

7. The method of claim 6, including providing access to said subsidiary ledger for said first entity or agents of said first entity, whereby said first entity or said agent can perform one or more activities selected from the group consisting of entering, deleting, reviewing, adjusting and processing information in said selected subsidiary ledgers.

8. The method of claim 1, including providing a funds transfer facility to facilitate transfer of funds to and from said first entity and said other entity.

9. The method of claim 8, including employing said funds transfer facility to receive an instruction to transfer funds; and transferring funds from said first entity to said other entity based on said instruction.

10. The method of claim 8, including employing said funds transfer facility to transmit data related to said transfer of funds.

11. The method of claim 8, including employing said funds transfer facility to adjust current records.

12. A financial accounting system for a first entity such as an individual or a business, said system comprising:

a financial accounting computer having at least one file;

a financial transaction computer for receiving data inputs, said data inputs including electronically recorded financial transactions made between said first entity and a second entity;

first communication means for transferring said data inputs from said financial transaction computer to said file of said financial accounting computer; and means for providing access to said file of said financial accounting computer for said first entity and/or agents of said first entity so that said first entity and/or said agent can perform one or more activities selected from the group consisting of entering, deleting, reviewing, adjusting and processing said data inputs.

13. The system of claim 12, wherein said financial accounting computer has means for generating at least one accounting report from said data inputs.

14. The system of claim 12, including a first said file in said financial accounting computer for receiving accrual accounting data inputs; and a second said file in said financial accounting computer for receiving cash accounting data inputs.

15. The system of claim 12, including means for transferring funds from said first entity to said second entity.

16. The system of claim 12, including said financial transaction computer has means for electronically recording, collecting, processing, storing and transmitting said financial transactions.

17. The system of claim 12, including said financial accounting computer is a personal computer or a telephone computer.

18. The system of claim 12, including said financial transaction computer is a personal computer.

* * * * *

(12) EX PARTE REEXAMINATION CERTIFICATE (6865th)

United States Patent
Brown

(10) Number: US 5,875,435 C1
(45) Certificate Issued: Jun. 9, 2009

(54) AUTOMATED ACCOUNTING SYSTEM

(75) Inventor: Gordon T. Brown, Pittsburgh, PA (US)

(73) Assignee: Noah Systems, Inc., Pittsburgh, PA (US)

Reexamination Request:
No. 90/008,481, Jan. 31, 2007

Reexamination Certificate for:
Patent No.: 5,875,435
Issued: Feb. 23, 1999
Appl. No.: 09/080,497
Filed: May 18, 1998

Related U.S. Application Data

(63) Continuation-in-part of application No. 08/313,988, filed on Sep. 28, 1994, now abandoned.

(51) Int. Cl.
*G06Q 40/00* (2006.01)

(52) U.S. Cl. .............................. 705/30; 705/33; 705/39
(58) Field of Classification Search .................. None
See application file for complete search history.

(56) References Cited

U.S. PATENT DOCUMENTS

| | | | |
|---|---|---|---|
| 2,509,718 A | 5/1950 | Barbey |
| 2,693,909 A | 11/1954 | Allan |
| 3,040,984 A | 6/1962 | Cox et al. |
| 3,492,655 A | 1/1970 | Deskevich et al. |
| 3,623,012 A | 11/1971 | Lowry |
| 3,749,892 A | 7/1973 | Stenning |
| 3,985,998 A | 10/1976 | Crafton |
| 4,025,905 A | 5/1977 | Gorgens |
| 4,222,109 A | 9/1980 | Siwula |
| 4,264,808 A | 4/1981 | Owens et al. |
| 4,277,837 A | 7/1981 | Stuckert |
| 4,308,588 A | 12/1981 | Siwula |
| 4,321,672 A | 3/1982 | Braun et al. |
| 4,341,951 A | 7/1982 | Benton |
| 4,370,649 A | 1/1983 | Fuerle |
| 4,376,978 A | 3/1983 | Musmanno |
| 4,412,287 A | 10/1983 | Braddock, III |
| 4,460,965 A | 7/1984 | Trehn |
| 4,536,647 A | 8/1985 | Atalla et al. |
| 4,549,264 A | 10/1985 | Carroll et al. |
| 4,569,029 A | 2/1986 | Hatta et al. |
| 4,594,663 A | 6/1986 | Nagata et al. |
| 4,727,243 A | 2/1988 | Savar |
| 4,799,156 A | 1/1989 | Shavit et al. |
| 4,837,556 A | 6/1989 | Matsushita et al. |
| 4,857,714 A | 8/1989 | Sunyich |
| 4,953,085 A | 8/1990 | Atkins |
| 4,958,368 A | 9/1990 | Parker |
| 4,989,141 A | 1/1991 | Lyons et al. |
| 5,056,019 A | 10/1991 | Schultz et al. |
| 5,093,787 A | 3/1992 | Simmons |
| 5,117,356 A | 5/1992 | Marks |

(Continued)

FOREIGN PATENT DOCUMENTS

| | | |
|---|---|---|
| GB | 2 251 098 A | 6/1992 |
| JP | 54058332 A | 5/1979 |
| JP | 03223958 A | 10/1991 |
| JP | 03242793 A | 10/1991 |
| JP | 7085181 A | 3/1995 |
| WO | WO 99/27477 | 6/1999 |

(Continued)

OTHER PUBLICATIONS

Toshiba Corporation, Agent III, Accounting Consolidation Sub–System, Nov. 11, 1992, A1, pp. 2–26, Japan.

(Continued)

*Primary Examiner*—Peter C. English

(57) ABSTRACT

An automated accounting system for an entity, such as an individual or business, is provided in which at least one file is established for the entity and a plurality of data inputs are provided to the file. The data inputs include electronically recorded transactions made between the entity and other entities. Access is provided to the file for agents of the entity so that one of the agents can perform one or more activities related to the data inputs such as entering, deleting, reviewing, adjusting and processing.

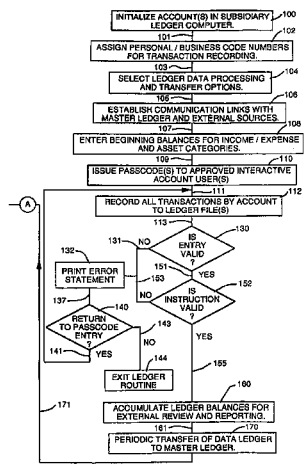

U.S. PATENT DOCUMENTS

| | | | |
|---|---|---|---|
| 5,126,936 | A | 6/1992 | Champion et al. |
| 5,144,115 | A | 9/1992 | Yoshida |
| 5,146,067 | A | 9/1992 | Sloan et al. |
| 5,172,313 | A | 12/1992 | Schumacher |
| 5,193,055 | A | 3/1993 | Brown et al. |
| 5,202,826 | A | 4/1993 | McCarthy |
| 5,206,803 | A | 4/1993 | Vitagliano et al. |
| 5,220,500 | A | 6/1993 | Baird et al. |
| 5,220,501 | A | 6/1993 | Lawlor et al. |
| 5,237,159 | A | 8/1993 | Stephens et al. |
| 5,262,942 | A | 11/1993 | Earle |
| 5,265,007 | A | 11/1993 | Barnhard, Jr. et al. |
| 5,283,829 | A | 2/1994 | Anderson |
| 5,287,270 | A | 2/1994 | Hardy et al. |
| 5,325,290 | A | 6/1994 | Cauffman et al. |
| 5,326,959 | A | 7/1994 | Perazza |
| 5,383,113 | A | 1/1995 | Kight et al. |
| 5,406,475 | A | 4/1995 | Kouchi et al. |
| 5,412,190 | A | 5/1995 | Josephson et al. |
| 5,420,405 | A | 5/1995 | Chasek |
| 5,471,669 | A | 11/1995 | Lidman |
| 5,649,115 | A | 7/1997 | Schrader et al. |
| 5,649,117 | A | 7/1997 | Landry |
| 5,740,271 | A | 4/1998 | Kunkler et al. |
| 5,842,185 | A | 11/1998 | Chancey et al. |
| 5,930,778 | A | 7/1999 | Geer |
| 5,946,669 | A | 8/1999 | Polk |
| 6,226,624 | B1 | 5/2001 | Watson et al. |
| 6,283,761 | B1 | 9/2001 | Joao |
| 2002/0032625 | A1 | 3/2002 | Brown |
| 2002/0046058 | A1 | 4/2002 | Brown |

OTHER PUBLICATIONS

Open Financial Exchange (OFX) Specification 1.0, dated Feb. 14, 1997, publication of CheckFree Corporation, Intuit Inc., and Microsoft Corporation.

"Microsoft Online–Banking Strategy Gains Wide Industry Support", Microsoft Corporation press release, May 8, 1996, www.microsoft.com/presspass/press/1996/may96/hmbank-pr.mspx.

"Quicken User Manual: Version 1.01 for Windows", Intuit Inc., 1991.

"Quicken User's Guide: Version 6 for IBM and PC Compatibles", Intuit Inc., Feb. 1993.

"Quicken User's Guide: Version 4 for Macintosh", Intuit Inc., May 1993.

"Quicken User's Guide: Version 7 for IBM and PC Compatibles", Intuit Inc., Sep. 1993.

Page et al., "Accounting and Information Systems", 4th Ed., Prentice–Hall Publishing, 1992.

Rahman et al., "Accounting Information Systems: Principles, Applications, and Future Directions", Prentice–Hall Publishing, 1988.

Boockholdt, "Accounting Information Systems: Transaction Processing and Controls", 3rd Ed., Irwin Publishing, 1993.

Page et al., "Accounting and Information Systems", 3rd Ed., Prentice–Hall Publishing, 1987.

Open Financial Exchange (OFX) Specification 1.0.1, Apr. 21, 1997, publication of CheckFree Corporation, Intuit Inc., and Microsoft Corporation.

"White Paper on Open Exchange (OE)", Sep. 16, 1996, publication of Intuit Inc.

"Extensible Markup Language (XML): W3C Working Draft Nov. 14, 1996", World Wide Web Consortium, http://www.w3.org/TR/WD–xml–961114.html.

Wilkinson, "Accounting Information Systems: Essential Concepts and Applications", John Wiley & Sons, Inc., 1989.

Wilkinson et al., "Accounting Information Systems: Essential Concepts and Applications", 3rd Ed., John Wiley & Sons, Inc., 1997.

Wilkinson, "Accounting Information Systems: Essential Concepts and Applications", 2nd Ed., John Wiley & Sons, Inc., 1993.

Romney et al., "Accounting Information Systems", 7th Ed., Addison–Wesley Publishing, 1997.

Gelinas et al., "Accounting Information Systems", 2nd Ed., South–Western College Publishing Co., 1993.

Gelinas et al., "Accounting Information Systems", 3rd Ed., South–Western College Publishing Co., 1996.

Davis et al., "Accounting Information Systems: A Cycle Approach", 3rd Ed., John Wiley & Sons, Inc., 1990.

Nash et al., "Accounting Information Systems", 3rd Ed., South–Western Publishing, 1993.

Bodnar et al., "Accounting Information Systems", 5th Ed., Prentice–Hall, Inc., 1993.

Cushing et al., "Accounting Information Systems and Business Organizations", 4th Ed., Addison–Wesley Publishing, 1987.

Wilkinson, "Accounting and Information Systems: Study Guide", 3rd Ed., John Wiley & Sons, 1991.

Maduegbuna, "A Critical Appraisal of the Continued Relevance of Bills of Exchange in an International Electronic Trade Environment", U. of Alberta, Master of Laws Thesis, 1992.

Antonio, "The Usefulness of the 'Audit Trail' in Electronic Data Processing Systems", Univ. of Illinois, Ph. D. dissertation, May 22, 1967.

Smith, "Transnational Banking Networks: A Telecommunications and Microcomputer Application for Small Offshore Operations", U.S. Int'l Univ., Ph.D. dissertation, May 17, 1982.

Summers, "Accounting Information Systems", Houghton Mifflin Company, 1989.

Leitch et al., "Accounting Information Systems Theory and Practice", 2nd Ed., Prentice–Hall, Inc., 1992.

Cushing et al., "Accounting Information Systems", 6th Edition, Addison–Wesley Publishing, 1994.

"Why majors have the cutting edge in proprietary debit cards", National Petroleum News, vol. 80, No. 12, pp. 34–35, Nov. 1988 (partial text).

The Depository Trust Company, "About DTC", http://dtcservices,dtcc.com/aboutdtc/dtcintro/dtcintro.

Yoder et al., "Five Financial Programs for the Home", PC Magazine, Feb. 1983, pp. 106, vol. 1, No. 10.

Olivieri, "Mind Your Business: Not Another Checkbook Program", Softalk, Oct. 1983, p. 258, v4.

Jones, Mitt, "Checkfree", PC Magazine, Jan. 16, 1990, pp. 144–145, vol. 9, No. 1.

The American Express Platinum Card, http://home1.americanexpress.com/apply/platinum/card/docs/page1b0.asp, Nov. 1, 2000.

Kadlec, "A consolidated approach to investment fund management", TMA Journal, Sep./Oct. 1994, vol. 14, No. 5, pp. 42–46.

Cushing et al., "Accounting Information Systems: A Comprehensive Approach", 5th Edition, Addison–Wesley Publishing, 1990.

Wilkens, "How Lawyers Can Use Microcomputers", Byte Magazine, May 1984, pp. 160–167.

Dow Jones Ledger Advertisement, Byte Magazine, May 1984.

Harrison, "Recordkeeping for Small Businesses", The American Association of Small Business Accountants, 1985.

Magid, "Software Speeds Banking–At–Home with Check-Book–Balancing Function", Power Computing, Nov. 7, 1988, p. F29.

Jones, "After Hours: Products for the Leisure Side of Personal Computing", PC Magazine, Nov. 14, 1989, pp. 513–514.

Shipley, "CheckFree 3.0", PC–Computing, vol. 6, No. 1, Jan. 1993, p. 300.

Cushing, B. E. et al.; "Accounting Information Systems"; Fifth Edition; Addison–Wesley Publishing Company, Inc., 1990; 890 pages.

Altman, B.; "Check Free: A Viable Bill–Paying Alternative"; Link–up; Jan./Feb. 1991; 8, 1 p. 22.

Interview with Don Kniffin; TMA Journal, Jan./Feb. 1994, ISSN:0731–1281; pp. 34–38 (5 pages).

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–18 is confirmed.

New claims 19–56 are added and determined to be patentable.

19. *The method of claim 1, wherein said first entity is an individual.*

20. *The method of claim 1, wherein said first entity is a business.*

21. *The method of claim 1, wherein at least one of said other entities is a merchant.*

22. *The method of claim 1, wherein at least one of said other entities is a financial institution.*

23. *The method of claim 1, wherein at least one of said other entities is a bank.*

24. *The method of claim 1, wherein said step of transmitting said record of each transaction and selected standardized codes to said at least one separate financial accounting system is performed via a communication network accessible by said first entity and said other entities.*

25. *The method of claim 7, wherein said first entity or said agent can perform entering of said information in said selected subsidiary ledgers.*

26. *The method of claim 7, wherein said first entity or said agent can perform deleting of said information in said selected subsidiary ledgers.*

27. *The method of claim 7, wherein said first entity or said agent can perform adjusting of said information in said selected subsidiary ledgers.*

28. *The method of claim 7, wherein said first entity or said agent can perform processing of said information in said selected subsidiary ledgers.*

29. *The system of claim 12, wherein said first entity is an individual.*

30. *The system of claim 12, wherein said first entity is a business.*

31. *The system of claim 12, wherein said financial accounting computer is operated by the first entity.*

32. *The system of claim 31, wherein said first entity is an individual.*

33. *The system of claim 12, wherein said financial accounting computer provides a menu of financial transaction codes for association with said financial transactions.*

34. *The system of claim 12, wherein said financial accounting computer provides a menu of standardized itemization codes for association with said financial transactions.*

35. *The system of claim 12, wherein said second entity is a merchant.*

36. *The system of claim 12, wherein said second entity is a financial institution.*

37. *The system of claim 12, wherein said second entity is a bank.*

38. *The system of claim 12, wherein said financial transactions include sale of goods and/or services from said second entity to said first entity.*

39. *The system of claim 12, wherein said financial transaction computer is operated by a merchant.*

40. *The system of claim 12, wherein said financial transaction computer is operated by a financial institution.*

41. *The system of claim 12, wherein said financial transaction computer is operated by a bank.*

42. *The system of claim 12, wherein said data inputs include electronically recorded financial transactions between said first entity and at least one additional entity.*

43. *The system of claim 42, wherein said first entity is an individual, said second entity is a merchant or financial institution, and said at least one additional entity is a merchant or a financial institution.*

44. *The system of claim 42, wherein said second entity is a merchant and said at least one additional entity is a merchant.*

45. *The system of claim 42, wherein said second entity is a merchant and said at least one additional entity is a financial institution.*

46. *The system of claim 42, wherein said second entity is a financial institution and said at least one additional entity is a financial institution.*

47. *The system of claim 12, wherein said first communication means includes communication links between said first entity, said second entity, and at least one additional entity.*

48. *The system of claim 12, wherein said access means allows said first entity and/or said agent to perform entering of said data inputs.*

49. *The system of claim 12, wherein said access means allows said first entity and/or said agent to perform deleting of said data inputs.*

50. *The system of claim 12, wherein said access means allows said first entity and/or said agent to perform adjusting of said data inputs.*

51. The system of claim 12, wherein said access means allows said first entity and/or said agent to perform processing of said data inputs.

52. A financial accounting system for a first entity such as an individual or a business, said system comprising:
   a financial accounting computer having at least one file;
   a financial transaction computer for receiving data inputs, said data inputs including electronically recorded financial transactions made between said first entity and a plurality of other entities;
   first communication means for transferring said data inputs from said financial transaction computer to said file of said financial accounting computer; and
   means for providing access to said file of said financial accounting computer for said first entity and/or agents of said first entity so that said first entity and/or said agent can perform one or more activities selected from the group consisting of entering, deleting, reviewing, adjusting and processing said data inputs.

53. A financial accounting system comprising:
   a financial accounting computer, and
   at least one ledger file on said financial accounting computer;
   wherein said financial accounting computer is configured to receive data inputs from a financial transaction computer, said financial transaction computer configured to receive said data inputs including electronically recorded financial transactions made between a first entity and a second entity, and wherein said financial accounting computer stores said data inputs in said at least one ledger file, said data inputs including an electronic representation of said financial transactions made between said first entity and said second entity;
   wherein said financial accounting computer and said financial transaction computer are coupled via a first communication means for transferring said data inputs from said financial transaction computer to said file of said financial accounting computer; and
   wherein said first entity and/or an agent of said first entity can access said file via means for providing access to said file of said financial accounting computer, said access allowing said first entity and/or said agent of said first entity to perform at least one of entering, deleting, reviewing, adjusting or processing said data inputs.

54. The financial accounting system as set forth in claim 53, wherein said financial accounting computer provides a menu of at least one financial transaction code for association with said financial transaction.

55. The financial accounting system as set forth in claim 53, wherein said financial accounting computer provides a menu of at least one standardized itemization code for association with said financial transaction.

56. A financial accounting system for a first entity such as an individual or a business, said system comprising:
   a financial accounting computer having at least one file, wherein said financial accounting computer cooperates with a financial transaction computer for receiving data inputs, said data inputs including electronically recorded financial transactions made between said first entity and a plurality of other entities;
   said financial accounting computer coupled to a first communication means for transferring said data inputs from said financial transaction computer to said file of said financial accounting computer, and
   means for providing access to said file of said financial accounting computer for said first entity and/or agents of said first entity so that said first entity and/or said agent can perform one or more activities selected from the group consisting of entering, deleting, reviewing, adjusting and processing said data inputs.

* * * * *